United States Patent
Sharpe et al.

(10) Patent No.: US 12,314,669 B2
(45) Date of Patent: *May 27, 2025

(54) TECHNOLOGIES FOR DYNAMICALLY CREATING REPRESENTATIONS FOR REGULATIONS

(71) Applicant: UL LLC, Northbrook, IL (US)

(72) Inventors: Spencer Sharpe, Laramie, WY (US); Annie Ibrahim Rana, Dublin (IE); Valeriy Liberman, Buffalo Grove, IL (US); Michael Arnold, Duvall, WA (US); Kyle Michael Caulfield, Mount Prospect, IL (US); James Cogley, Dublin (IE); Lisa Epstein, Boston, MA (US); Tricia Sheehan, West Springfield, MA (US); Rashid Mehdiyev, Buffalo Grove, IL (US); Saurav Acharya, Des Plaines, IL (US)

(73) Assignee: UL LLC, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/373,671

(22) Filed: Sep. 27, 2023

(65) Prior Publication Data
US 2024/0020480 A1   Jan. 18, 2024

Related U.S. Application Data

(63) Continuation of application No. 17/072,319, filed on Oct. 16, 2020, now Pat. No. 11,783,132.
(Continued)

(51) Int. Cl.
*G06F 40/295* (2020.01)
*G06F 40/197* (2020.01)
(Continued)

(52) U.S. Cl.
CPC .......... *G06F 40/295* (2020.01); *G06F 40/197* (2020.01); *G06F 40/205* (2020.01); *G06F 40/284* (2020.01)

(58) Field of Classification Search
CPC ....................................................... G06F 16/35
See application file for complete search history.

(56) References Cited

U.S. PATENT DOCUMENTS

| | | | |
|---|---|---|---|
| 7,734,606 B2 | 6/2010 | Walker | |
| 8,204,869 B2* | 6/2012 | Paknad | G06Q 10/10 707/778 |

(Continued)

OTHER PUBLICATIONS

International Application No. PCT/US2020/055936, International Search Report and Written Opinion, mailed Feb. 9, 2021.
(Continued)

*Primary Examiner* — Jesse S Pullias
(74) *Attorney, Agent, or Firm* — MARSHALL, GERSTEIN & BORUN LLP

(57) ABSTRACT

Systems and methods for dynamically generating object models corresponding to regulations. According to certain aspects, a server computer may access a regulation and automatically generate a summary of the regulation based on a specific set of sentences. The server computer may additionally determine a set of topics and named-entity attributes for text within a regulation object model, as well as a probability that a topic or attribute is applicable to the regulation. Further, the server computer may generate and enrich object models according to the various analyses and avail the enriched object models for review by entities and users of regulatory compliance services.

20 Claims, 4 Drawing Sheets

Related U.S. Application Data

(60) Provisional application No. 62/923,306, filed on Oct. 18, 2019.

(51) Int. Cl.
  *G06F 40/205* (2020.01)
  *G06F 40/284* (2020.01)

(56) References Cited

U.S. PATENT DOCUMENTS

| | | | |
|---|---|---|---|
| 9,292,623 | B2 | 3/2016 | Walker |
| 11,687,827 | B2 * | 6/2023 | Pondicherry Murugappan ........... G06Q 10/10 706/11 |
| 11,783,132 | B2 * | 10/2023 | Sharpe .................... G06F 40/30 704/9 |
| 2004/0139053 | A1 | 7/2004 | Haunschild |
| 2011/0145269 | A1 | 6/2011 | Kraftsow et al. |
| 2013/0024388 | A1 | 1/2013 | Kolb |
| 2013/0262484 | A1 | 10/2013 | Kamat et al. |
| 2015/0347390 | A1 | 12/2015 | Tewari et al. |
| 2017/0103486 | A1 | 4/2017 | Cai et al. |
| 2018/0129954 | A1 | 5/2018 | Saxena et al. |
| 2018/0330455 | A1 | 11/2018 | Bayyapu et al. |
| 2019/0354551 | A1 * | 11/2019 | Gulati .................... G06Q 50/26 |
| 2020/0151392 | A1 | 5/2020 | Crabtree et al. |

OTHER PUBLICATIONS

Zhong et al., Automatic summarization of legal decisions using iterative masking of predictive sentences, ICAIL '19, Jun. 17-21, 2019.

* cited by examiner

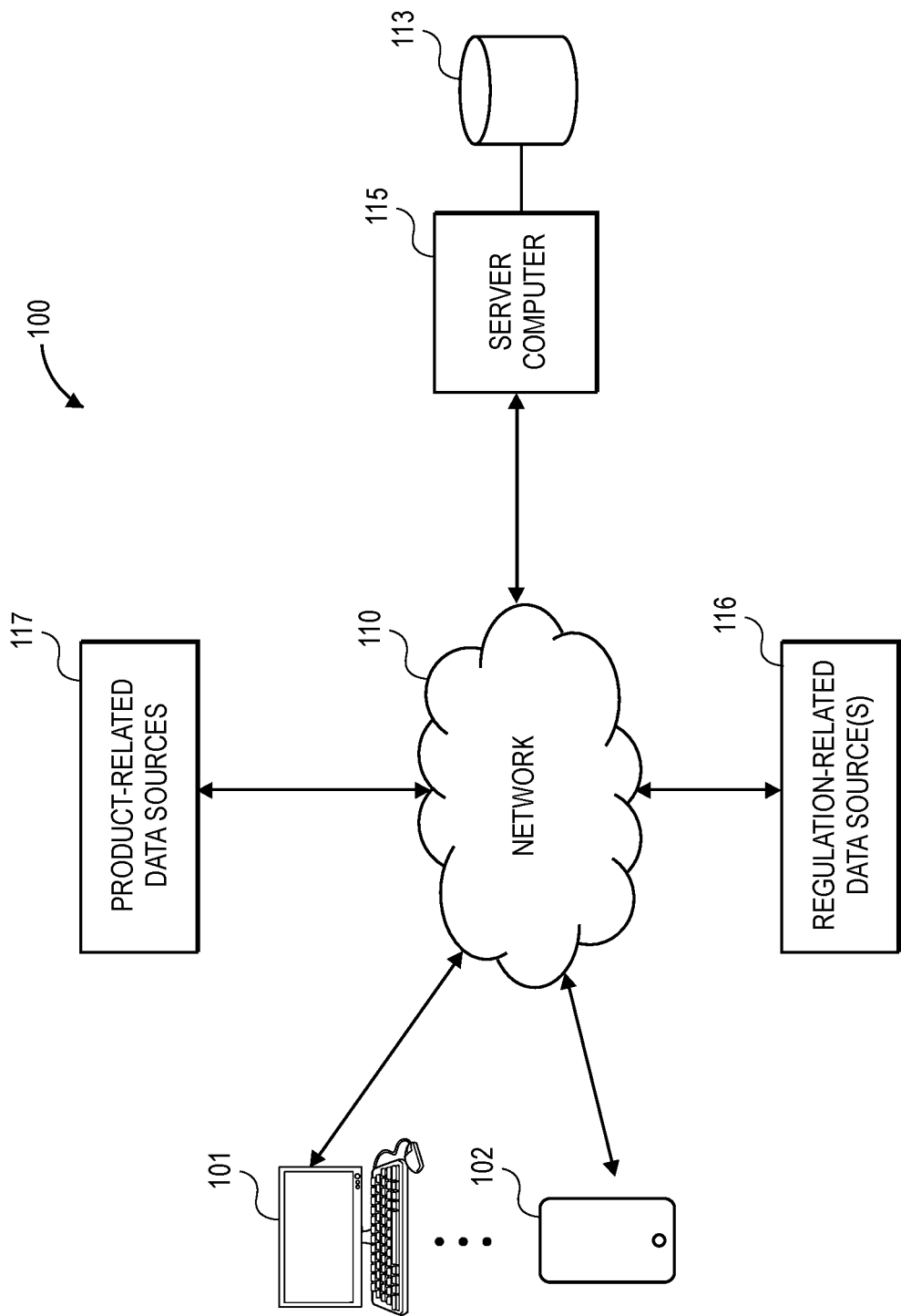

TECHNOLOGIES FOR DYNAMICALLY CREATING REPRESENTATIONS FOR REGULATIONS

CROSS-REFERENCE TO RELATED APPLICATIONS

This application is a continuation of U.S. patent application Ser. No. 17/072,319, filed Oct. 16, 2020, which claims priority to U.S. Patent Application No. 62/923,306, filed Oct. 18, 2019. The disclosures of these applications are hereby incorporated by reference in their entireties.

FIELD

The present disclosure is directed to creating standardized object models for regulations. More particularly, the present disclosure is directed to platforms and technologies for analyzing ingested regulations, creating object models, and allowing versioning of regulations or object models for the regulations that indicate applicable topics and categories.

BACKGROUND

The amount and scope of consumer products available for sale in the marketplace is constantly changing as new products are introduced and existing products are improved or modified. In particular, product manufacturers, distributors, and the like will consistently release new products and update existing products to meet consumer demand and to compete with other manufacturers, distributors, and the like. Generally, a product is specified according to a protocol and a specification, where the protocol is a collection of compliance and/or voluntary performance testing requirements that a product must meet for a given customer to enter a given market, where a product specification or datasheet may describe the product, features thereof, brand claims, and/or other aspect. Both protocols and specifications may serve to describe differentiators of the product.

Throughout the product lifecycle, from ideation to disposal, products are subject to governance in the form of regulations, laws, legislative documents, and standards. Typically, different jurisdictions (e.g., federal, unions, trade authorities, state, county, and others) have different regulations for different products. For example, California may regulate lithium-ion batteries differently than Texas. However, in addition to defining different requirements, regulations are often not consistent in terminology, scope, format, and applicability, among other inconsistencies. Additionally, regulations may govern other aspects related to the product, such as components and materials that are part of product engineering or packaging of an end-product, amongst others, adding a great amount of complexity to the survey of applicable regulations. Therefore, entities associated with products (e.g., retailers, manufactures, suppliers, etc.) are not able to effectively ascertain the requirements of certain regulations or determine which regulations may be applicable for certain products, especially new or updated products.

Accordingly, there is an opportunity for platforms and technologies that effectively and efficiently categorize and determine applicability of regulations issued by different jurisdictions.

SUMMARY

In an embodiment, a computer-implemented method of creating object models for regulations for a given market(s) is provided. The method may include: accessing, by a computer processor, a set of regulatory information corresponding to a regulation; segmenting, by the computer processor, the set of regulatory information into a set of structured texts and a set of metadata; generating, by the computer processor, an object model for the regulation, the object model comprising the set of structured texts and the set of metadata; performing, by the computer processor, a linguistic analysis on the object model to detect a set of sentences within the set of structured texts; generating, by the computer processor based on the set of sentences, a summary of the regulation; and enriching, by the computer processor, the object model for the regulation with the summary of the regulation.

In another embodiment, a system for dynamically creating object models for regulations is provided. The system may include: a memory storing instructions, and a processor interfaced with the memory. The processor may be configured to execute the instructions to cause the processor to: access a set of regulatory information corresponding to a regulation, segment the set of regulatory information into a set of structured texts and a set of metadata, generate an object model for the regulation, the object model comprising the set of structured texts and the set of metadata, perform a linguistic analysis on the object model to detect a set of sentences within the set of structured texts, generate, based on the set of sentences, a summary of the regulation, and enrich the object model for the regulation with the summary of the regulation.

BRIEF DESCRIPTION OF THE FIGURES

FIG. 1A depicts an overview of components and entities associated with the systems and methods, in accordance with some embodiments.

DETAILED DESCRIPTION

Figure 1B:
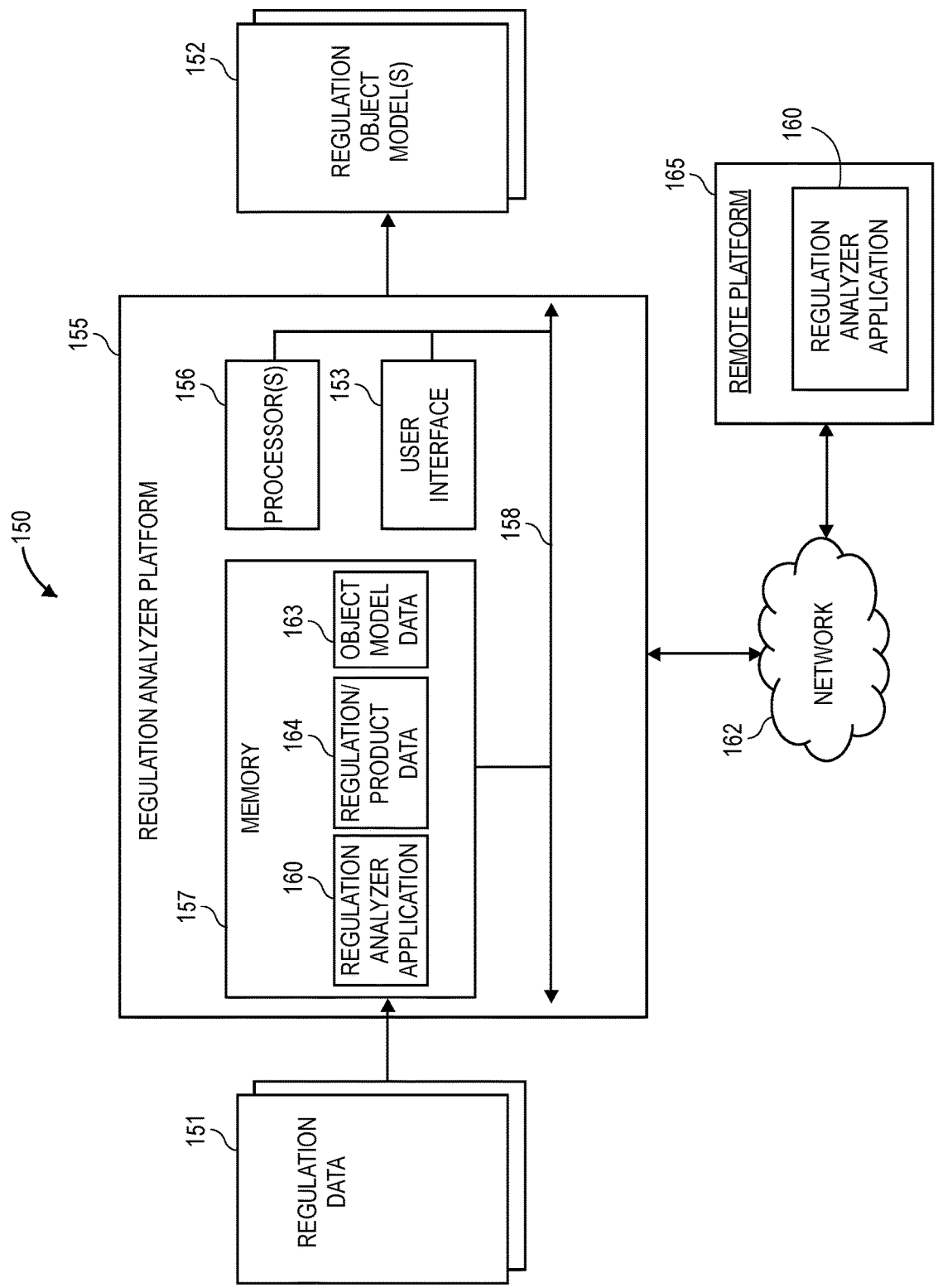
FIG. 1B depicts an overview of certain components configured to facilitate the systems and methods, in accordance with some embodiments.

The present embodiments may relate to, inter alia, platforms and technologies for dynamically analyzing regulations applicable to a plurality of products, or components, materials, chemicals, attributes or features that might be associated with a product, across a plurality of jurisdictions. According to certain aspects, systems and methods may receive or otherwise access regulations and segment them into a set of structured texts, where the structured texts may include a header, footer, title, body, sections, sub-sections, paragraphs, lists, sub-lists, citations, references, or any other type of information block indicated in the format of the original document. The systems and methods may further segment the regulations into a set of metadata containing additional information related to the content and subject matter of the underlying regulation. The systems and methods may further analyze the regulations to determine a set of sentences and, from the set of sentences, automatically generate a summary for each regulation.

The systems and methods may additionally classify the set of sentences to determine a set of topics for each of the sentences, where each of the set of topics has an associated probability of being applicable to the underlying regulation. In this regard, the systems and methods may avail sentences having topics that meet a threshold probability that enables users to gain additional insight into the regulation. The systems and methods may generate object models for the regulations and enhance the object models with additional data determined as a result of the various analyses. It should be appreciated that the systems and methods may operate using the English language or any other language, and/or may translate information from one language(s) into another language(s).

The systems and methods therefore offer numerous benefits. In particular, the object models generated by systems and methods may be in a standard format which mitigates the various inconsistencies and complexities present in issued regulations governing products and their associated components, materials, chemicals, attributes, features, labelling and packaging. Additionally, various entities or individuals may access the object models to effectively and efficiently ascertain relevant information about the regulations and/or products, components, materials, chemicals, attributes or features that may be affected by the regulations. In particular, the entities or individuals may determine, from the object models, a set of topics for and/or a set of terms that may be particularly relevant to the underlying regulations. The systems and methods may also store the object models in a central database for effective retrieval by the entities and individuals. It should be appreciated that additional benefits are envisioned.

As an example, a change in a particular regulation of a product, such as one specific to a particular product construction or function of the product, may drive a change in the design of the product. Additionally, if a new regulation is restricting content of a hazardous chemical, the producer may have to reformulate the product to ensure continual compliance with the new regulation. Additionally, the systems and methods may utilize automated processes to access and manage certain product-related details and features, components, or materials (e.g., to link with product design and development stages of the produce lifecycle). The systems and methods may be used by product designers to receive automatic alerts whenever a regulatory change may require a specific change to the design, testing, inspection, certification, labelling or packaging of the product, and may directly integrate with product development applications to automatically reflect applicable regulatory changes and propose or suggest protocol or specification/datasheet augmentations.

The systems and methods discussed herein address a challenge particular to supply chain management. The challenge relates to a difficulty in accurately and effectively assessing how regulations should be interpreted or applied, and determining which regulations may be applicable to products or product categories before their introduction to market, especially because of inconsistencies and complexities between and among product protocols and regulations. Conventionally, individuals must manually review regulations to determine their scope and applicability to certain products. However, these conventional methods are often time consuming, ineffective, and/or expensive. Additionally, regulations are not consistent in scope, terminology, and formatting across different jurisdictions. Further, regulations typically do not mention end-products, but rather the components, materials, chemicals, attributes or features affiliated with many types of products or product categories. The systems and methods offer capabilities to solve these problems by dynamically analyzing regulations to determine relevant attributes, generating object models for the regulations that are consistent in format and indicate the relevant product attributes, and enabling effective access to the object models. Further, because the systems and methods employ communication between and among multiple devices and components, the systems and methods are necessarily rooted in computer technology in order to overcome the noted shortcomings that specifically arise in the realm of supply chain management.

FIG. 1A illustrates an overview of a system 100 of components configured to facilitate the systems and methods. It should be appreciated that the system 100 is merely an example and that alternative or additional components are envisioned.

As illustrated in FIG. 1A, the system 100 may include a set of electronic devices 101, 102. Each of the electronic devices 101, 102 may be any type of electronic device such as a mobile device (e.g., a smartphone), desktop computer, notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like. In embodiments, any of the electronic devices 101, 102 may be an electronic device associated with an entity such as a company, business, corporation, or the like (e.g., a server computer or machine).

Each of the electronic devices 101, 102 may be used by any individual or person (generally, a user). According to embodiments, the user may use the respective electronic device 101, 102 to input various information associated with a product(s) and/or a regulation(s). The product(s) may be offered for sale or otherwise made available for purchase or use by a business, company, service provider, or the like, and may be regulated in an applicable jurisdiction by an applicable regulation(s). Alternatively or additionally, the business, company, service provider, or the like may be contemplating offering the product for sale or purchase in a certain jurisdiction(s). In embodiments, the information may represent an iteration, update, or new version of the product(s). The user may also use the electronic devices 101, 102 to input a query associated with a product and/or a regulation.

The electronic devices 101, 102 may communicate with a server computer 115 via one or more networks 110. The server computer 115 may be associated with an entity such as a company, business, corporation, or the like, which accesses, aggregates, and analyzes existing and/or new regulations. Additionally or alternatively, the server computer 115 may be associated with an entity such as a company, business, corporation, or the like, which markets, manufactures, or sells products, or otherwise interfaces or communicates with entities that market, manufacture, or sell the products. In embodiments, the electronic devices 101, 102 may transmit or communicate, via the network(s) 110, information associated with products and/or regulations, or queries related thereto, to the server computer 115.

In embodiments, the network(s) 110 may support any type of data communication via any standard or technology including various wide area network or local area network protocols (e.g., GSM, CDMA, VoIP, TDMA, WCDMA, LTE, EDGE, OFDM, GPRS, EV-DO, UWB, Internet, IEEE 802 including Ethernet, WiMAX, Wi-Fi, Bluetooth, and others). Further, in embodiments, the network(s) 110 may be any telecommunications network that may support a telephone call between the electronic devices 101, 102 and the server computer 115.

In some implementations, the server computer 115 may communicate with one or more product-related data sources 117. According to embodiments, the product-related data sources(s) 117 may alternatively or additionally receive, access, and/or store various product information, including product components, materials, chemicals, attributes, features, intended use, labelling, packaging, or any data that might pertain to regulatory requirements. Additionally, the product-related data source(s) 117 may be associated with businesses, companies, service providers, or the like, that may have an agreement, partnership, or contract with an entity associated with the server computer 115, and that offer or contemplate offering various products. Generally, when a business, company, service provider, or the like issues or new or updated product information, the corresponding product-related data source 117 may push or otherwise send the new or updated product protocol or specification/datasheet to the server computer 115, or the server computer 115 may pull or retrieve the new or updated product information from the corresponding product-related data source 117. Accordingly, the server computer 115 may store the most up-to-date product information issued by the participating businesses, companies, services providers or the like.

The server computer 115 may additionally communicate with a regulation-related data source(s) 116. According to embodiments, the regulation-related data source(s) 116 may be associated with various regulatory bodies or agencies that may set or institute regulations. For example, the regulation-related data source(s) 116 may be associated with the U.S. Consumer Product Safety Commission (CPSC), the U.S. Environmental Protection Agency (EPA), the U.S. Federal Aviation Administration (FAA), the U.S. Federal Communications Commission (FCC), the U.S. Food and Drug Administration (FDA), the U.S. Federal Trade Commission (FTC), the U.S. National Highway Traffic Safety Administration (NHTSA), the U.S. Nuclear Regulatory Commission (NRC). The regulatory bodies or agencies may be any combination of federal-level, state-level, municipal-level, local-level, foreign, digital, or other level of regulatory bodies or agencies. Generally, when a regulatory body or agency issues or new or updated regulation, the corresponding regulation-related data source 116 may push or otherwise send the new or updated regulation to the server computer 115, or the server computer 115 may pull or retrieve the new or updated regulation from the corresponding regulation-related data source 116. Accordingly, the server computer 115 may store the most up-to-date regulations issued by the participating regulatory bodies or agencies. According to embodiments, the server computer 115 may also store historic versions of the regulations, and may link or otherwise associate the historic versions with the respective current, up-to-date and/or consolidated versions of the regulations.

Generally, the server computer 115 may employ various machine learning techniques, calculations, algorithms, and the like to generate and maintain a machine learning model associated with regulations and/or products. The server computer 115 may initially train the machine learning model(s) using a set of training data, or may not initially train the machine learning model(s). According to embodiments, the server computer 115 may analyze any information received from the regulation-related data source(s) 116, for example using the machine learning model, to analyze regulation information, generate information resulting therefrom, and generate corresponding object models. The server computer 115 may avail the result(s) of the analysis (e.g., by presenting the result(s) in a user interface) for review and further selection by a user of the server computer 115). These functionalities are further described with respect to FIG. 1B.

The server computer 115 may be configured to interface with or support a memory or storage 113 capable of storing various data, such as in one or more databases or other forms of storage. According to embodiments, the storage 113 may store data or information associated with any machine learning models and/or object models that are generated by the server computer 115, any regulation information received from the regulation-related data sources 116, or any product information received from the electronic devices 101, 102 and/or from the product-related data source(s) 117.

Although depicted as a single server computer 115 in FIG. 1A, it should be appreciated that the server computer 115 may be in the form of a distributed cluster of computers, servers, machines, or the like. In this implementation, the entity may utilize the distributed server computer(s) 115 as part of an on-demand cloud computing platform. Accordingly, when the electronic devices 101, 102 and the data sources 116, 117 interface with the server computer 115, the electronic devices 101, 102 and the data sources 116, 117 may actually interface with one or more of a number of distributed computers, servers, machines, or the like, to facilitate the described functionalities.

Further, although two (2) electronic devices 101, 102 and one (1) server computer 115 are depicted in FIG. 1A, it should be appreciated that greater or fewer amounts are envisioned. For example, there may be multiple server computers, each one associated with a different entity. FIG. 1B depicts more specific components associated with the systems and methods.

FIG. 1B depicts an example environment 150 in which regulation data 151 is processed into a set of regulation object models 152 via a regulation analyzer platform 155, according to embodiments. The regulation analyzer platform 155 may be implemented on any computing device, including the server computer 115 (or in some implementations, one or more of the electronic devices 101, 102) as discussed with respect to FIG. 1A. Components of the computing device may include, but are not limited to, a processing unit (e.g., processor(s) 156), a system memory (e.g., memory 157), and a system bus 158 that couples various system components including the memory 157 to the processor(s) 156.

In some embodiments, the processor(s) 156 may include one or more parallel processing units capable of processing data in parallel with one another. The system bus 158 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The regulation analyzer platform 155 may further include a user interface 153 configured to present content (e.g., information associated with regulations and/or object models generated therefrom). Additionally, a user may make selections to the content via the user interface 153, such as to navigate through different information, select and review certain object models and information related thereto, and/or other actions. The user interface 153 may be embodied as part of a touchscreen configured to sense touch interactions and gestures by the user. Although not shown, other system components communicatively coupled to the system bus 158 may include input devices such as a cursor control device (e.g., a mouse, trackball, touch pad, etc.) and keyboard (not shown). A monitor or other type of display device may also be connected to the system bus 158 via an interface, such as a video interface. In addition to the monitor, computers may also include other peripheral output devices such as a printer, which may be connected through an output peripheral interface (not shown).

The memory 157 may include a variety of computer-readable media. Computer-readable media may be any available media that can be accessed by the computing device and may include both volatile and nonvolatile media, and both removable and non-removable media. By way of non-limiting example, computer-readable media may comprise computer storage media, which may include volatile and nonvolatile, removable and non-removable media implemented in any method or technology for storage of information such as computer-readable instructions, routines, applications (e.g., a regulation analyzer application 160), data structures, program modules or other data.

Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the processor 156 of the computing device.

The regulation analyzer platform 155 may operate in a networked environment and communicate with one or more remote platforms, such as a remote platform 165, via a network(s) 162, such as a local area network (LAN), a wide area network (WAN), telecommunications network, or other suitable network. The platform 165 may be implemented on any computing device, including one or more of the electronic devices 101, 102, or the server computer 115 as discussed with respect to FIG. 1A, and may include many or all of the elements described above with respect to the platform 155. In some embodiments, as will be described herein, the regulation analyzer application 160 as will be further described herein may be stored and executed by the remote platform 165 instead of by or in addition to the platform 155.

The regulation analyzer platform 155 may store, as regulation and product data 164, any information associated with product protocols and regulations, such as the received regulation data 151. Additionally, the regulation analyzer application 160 may employ machine learning techniques such as, for example, a regression analysis (e.g., a logistic regression, linear regression, or polynomial regression), k-nearest neighbors, decision trees, random forests, boosting, neural networks, support vector machines, deep learning, reinforcement learning, latent semantic analysis, Bayesian networks, graph analysis, word embeddings, or the like. Generally, the regulation analyzer platform 155 may support various supervised and/or unsupervised machine learning techniques.

Figure 2:
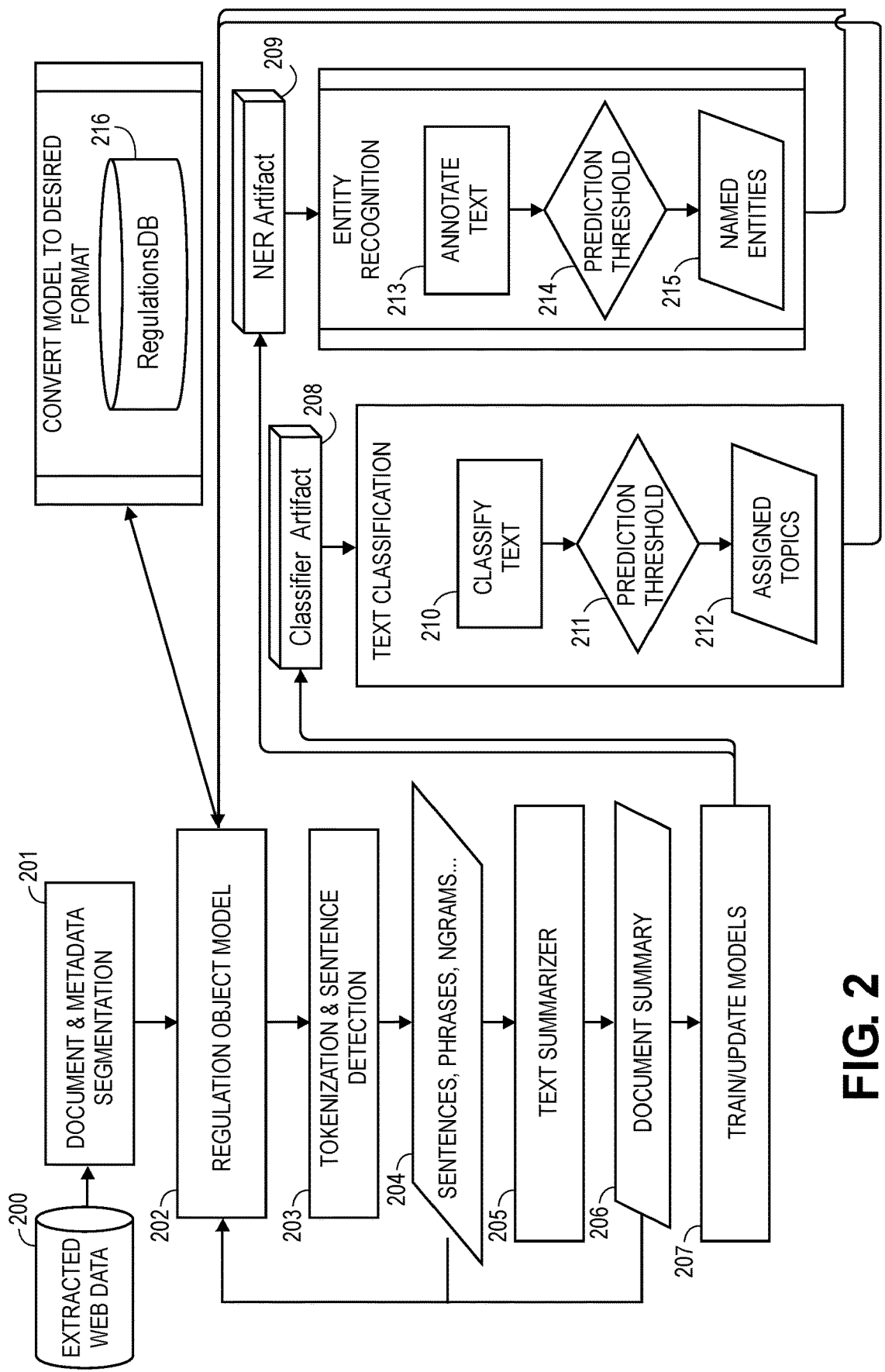
FIG. 2 is an example flowchart depicting various functionalities associated with the systems and methods, in accordance with some embodiments.

According to embodiments, the regulation analyzer application 160 may analyze the regulation data 151 and may generate resulting object model data 163 which may be stored in the memory 157. The regulation analyzer application 160 may enrich the object model data 163 with information generated from analyzing the regulation data 151, using various of the techniques as discussed herein. Further, the regulation analyzer application 160 may output the set of regulation object models 152 which may contain the ingested regulation(s) and metadata, along with extracted information, topical classifications, and summaries produced by the regulation analyzer application 160. The regulation analyzer application 160 (or another component) may cause the regulation object model(s) 152 (and, in some cases, the originally-received data 151) to be displayed on the user interface 153 for review by the user of the regulation analyzer platform 155. The user may select to review and/or modify the displayed data. FIG. 2 details functionalities associated with the analysis of the regulation data 151 and the generation of the set of regulation object models 152.

In general, a computer program product in accordance with an embodiment may include a computer usable storage medium (e.g., standard random access memory (RAM), an optical disc, a universal serial bus (USB) drive, a big data processing engine, a NoSQL repository, or the like) having computer-readable program code embodied therein, wherein the computer-readable program code may be adapted to be executed by the processor 156 (e.g., working in connection with an operating systems) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML, JSON). In some embodiments, the computer program product may be part of a cloud network of resources. Generally, each of the data 151 and the data 152 may be embodied as any type of electronic document, file, template, object model, etc., that may include various textual content, images, figures, tables, footnotes, citations, appendices, or other referenced materials, and may be stored in memory as program data in a hard disk drive, magnetic disk and/or optical disk drive in the regulation analyzer platform 155 and/or the remote platform 165. For example, the set of regulation object models 152 may be stored in JavaScript Object Notation (JSON) format.

FIG. 2 is an example flowchart depicting various functionalities associated with the systems and methods. A server computer (e.g., the server computer 115 as discussed with respect to FIG. 1A) may perform various of the functionalities depicted in FIG. 2.

Reference 200 of FIG. 2 represents a corpus or set of data that may be extracted from a web site or another source (such as the regulation-related data source(s) 116 as discussed with respect to FIG. 1A). The set of data 200 may include a set of electronic documents respectively corresponding to a set of regulations, where each electronic document may have a defined structure, format (e.g., HTML, PDF, XML, JSON, etc.), and/or the like. In embodiments, the set of data 200 may be retrieved from a source via an application programming interface (API), or via one or more other data sources (e.g., web crawls, RSS, etc.). According to embodiments, the set of data 200 may be annotated or labeled (e.g., may include metadata indicating topics corresponding to the regulation), or may be unlabeled.

The server computer may analyze or examine (201) the data 200 to segment or parse the data 200 into various components or sections. In particular, depending on the format or structure of the electronic documents, the server computer may identify, extract, organize, or segment the various sections of the electronic document into a set of structured texts including, for example, a title, body or paragraph(s), section or sub-sections, itemized lists or sub-lists, citations, references, header, footer, and/or the like. Additionally, the server computer may identify, extract, or segment various metadata associated with the electronic document. For example, the metadata may include a set of tags or topic labels that are included with the electronic document and that may be descriptive of the regulation described in the electronic document. In some embodiments, the server computer may automatically generate (e.g., using a data model) a set of topics or tags for the electronic document, based on the content of the electronic document, such as if the electronic document does not have such topics or tags included. The server computer may alternatively or additionally generate the set of topics or tags for the electronic document based on additional information from internal data sources that may be descriptive of product testing, inspection, and certification requirements, or of the engineering of products and their affiliated components, materials, chemicals, attributes or features.

The server computer may, for each electronic document, generate a regulation object model (202) which, according to embodiments, may be a structured data object having a consistent format and structure across object models. Subsequent processing of the regulation object models and respective electronic documents may enrich the regulation object models with additional data, as discussed with respect to 203, 204, 205, and 206. According to embodiments, the regulation object model may be in various formats such as, for example, JSON, XML or RDF.

At 203, the server computer may tokenize and detect sentences included in the electronic document. In particular, the server computer may detect words and phrases in the electronic documents, represented as n-grams, and may identify sentences or phrases as a consecutive string of n-grams. The n-grams, phrases, and sentences as identified or determined by the server computer are represented as 204.

At 205, the server computer may generate a summary for the electronic document. In some embodiments, the server computer may generate the summary using a relevant or representative sentence(s) from the electronic document, or generate a summary based upon a learned representation of regulatory text, where the summary may be an abstractive summarization. Generally, the server computer may generate the summary of the regulation, or regulation section, using a machine learning algorithm that yields a summarization model from a corpus of regulatory training data. Additionally, the server computer may use various techniques to rank the set of sentences according to a relevancy of the set of sentences to the regulation, extract or identify a portion of the set of sentences that are deemed most relevant to the requirements of a regulation, and generate the summary using the portion of the set of sentences. In other embodiments, the server computer may use trained language models, cosine-similarity, natural language processing, or any other sentence or word similarity measure to generate summary content from any portion of the regulation object model. The server computer may add the summary content (represented as 206) to the regulation object model, thus enriching the regulation object model.

At 207, the server computer may train, update, modify, or enhance the summarization model(s) in (205) and/or from various portions of the corresponding regulation object model, including addition of topical information (212) and/or extracted entities (215), each of which may have an assigned probability of being applicable to the underlying regulation.

At 208, a classifier artifact may update one or more of a topic prediction model and an entity extraction model, the output of which may feed back (with or without SME/analyst review) into the object model for further training. In particular, the server computer may apply the classifier model to a portion of text in the electronic document and calculate a probability of applicability of regulatory topics for that sentence. Block 210 represents sentences in the electronic document that are classified using the classifier model, and block 211 represents the sentences being filtered based on the probability of applicability of the regulatory topics. Accordingly, the server computer (or a user thereof) may output a list of sentences in the electronic document where each sentence in the list of sentences lists at least one particular regulatory topic having a probability that at least meets a specified threshold. For example, a user may query for and/or the server may output sentences in a particular regulation having the predicted regulatory topics "plastics" and "food additive" with at least an 85% probability of applicability, thereby meeting a set threshold for adding a topical assignment to that sentence in the object model. As a result, the server computer may enable for an understanding of what regulatory topics are being discussed in various sections of the electronic document (block 212), which the enriched regulation object model may additionally reflect.

The server computer may also extract a set of recognized entities as key terms or phrases from the regulatory text(s). At 209, a named-entity recognition (NER) artifact may locate and classify named entities mentioned in unstructured text into pre-defined categories. In particular, the server computer can annotate the text (block 213). Additionally, the server computer may identify key terms and phrases based on blocks of texts having a topic label that exceeds a prediction threshold according to an entity recognition model trained to identify key terms and phrases associated with the predicted regulatory topics (block 214). This results in a set of keywords and/or phrases (block 215) of the text that are meaningful or significant to the electronic document, and/or to the regulation itself. It should be appreciated that the server computer may employ additional or alternative topic-salience techniques or algorithms for extracting a set of keywords or phrases. The server computer may add the keywords and/or phrases, along with predicted entity names, to the regulation object model represented by block 202.

By enriching the original regulation object model 202, the server computer may output or avail a profile of the underlying regulation for storage in a regulations database 216. When a new, existing, or updated regulation is accessed by the server computer, the server computer may identify regulatory structure, segment and parse the document, assign topic labels, keywords and/or phrases, and add any or all of this information to the regulation object model for that particular regulation. The database 216, then, may store multiple regulation object models representing multiple regulations, where the regulation object models may be consistent in format and structure, and may cover multiple jurisdictions. Therefore, instead of having to review the raw text of a given regulation, an entity or user may instead access particular regulations stored in the database 216 to effectively ascertain any requirements, topics, keywords, and/or issues that may be included in the regulation object models. According to embodiments, the regulations database 216 may store previous (i.e., historical) and/or consolidated versions of various regulations, where any access of the previous versions may indicate any differences between the previous versions and the current versions of the various regulations.

As an example, a regulation in a particular jurisdiction may be issued that regulates the amount of lead in surface coating of select product categories. The server computer may determine an influential or prominent sentence(s) based on frequency statistics over the entire corpus (e.g., sentence(s) that identify relevant chemical restrictions and covered product types), and may generate a summary using the determined sentence(s). The server computer may apply a classifier model to determine, from the summary, the following set of topic labels: lead, coating, surface coating, hazardous, toys, children, lead-containing, paint, furniture, consumer product, along with respective probabilities of applicability of the topic labels.

Figure 3:
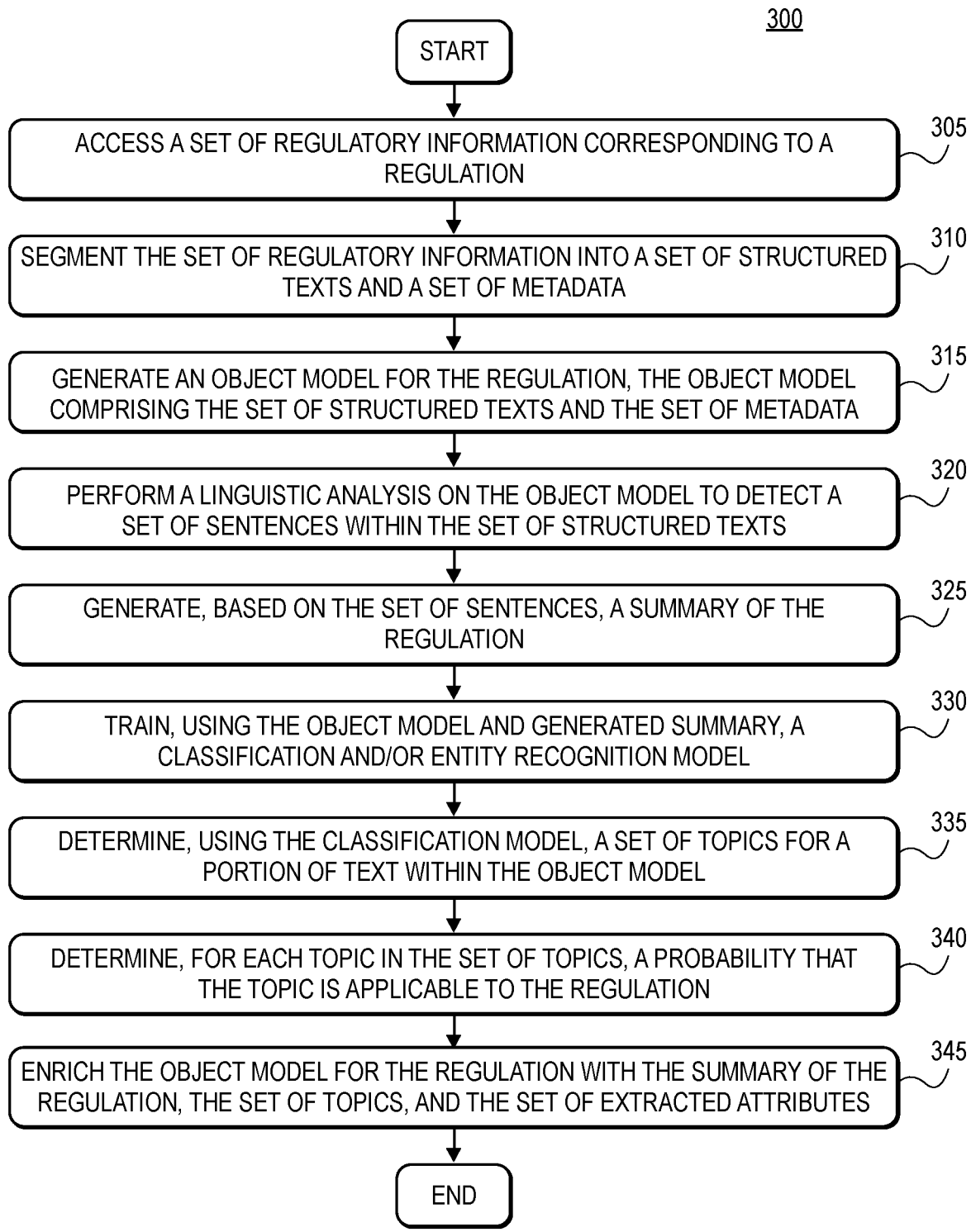
FIG. 3 is another example flowchart associated with creating object models for regulations, in accordance with some embodiments.

FIG. 3 depicts a block diagram of an example method 300 for creating object models for regulations. The method 300 may be facilitated by an electronic device (such as the server computer 115 or components associated with the regulation analyzer platform 115 as discussed with respect to FIGS. 1A and 1B) that may be in communication with additional devices and/or data sources.

The method 300 may begin when the electronic device accesses (block 305) a set of regulatory information corresponding to a regulation. In embodiments, the electronic device may access the set of regulatory information from one or more data sources. The electronic device may segment (block 310) the set of regulatory information into a set of structured texts that may include, for example, a header, footer, title, body, sections, sub-sections, paragraphs, lists, sub-lists, citations, references, or any other type of information block indicated in the format of the original document, and a set of metadata that may contain additional information related to the content and subject matter of the regulation. In some embodiments, the set of metadata may include a set of topic labels that is originally included in the set of regulatory information. In other embodiments, the electronic device may examine the set of regulatory information to determine that a set of topic labels is not present, generate a set of applicable topic labels for the set of regulatory information, and store the set of applicable topic labels with the set of metadata.

The electronic device may generate (block 315) an object model for the regulation, where the object model may include the set of structured texts and the set of metadata. According to embodiments, the object model may be in various formats such as, for example, JSON, XML, RDF, or other formats.

The electronic device may perform (block 320) a linguistic analysis on the object model to detect a set of sentences within the set of structured texts. In performing the analysis, the electronic device may use one or more various linguistic and/or statistical analyses to generate a set of token n-grams from the set of sentences, or conversely may detect the set of sentences from the set of n-grams.

The electronic device may generate (block 325), based on the set of sentences, a summary of the regulation and/or its segments. In embodiments, the electronic device may rank the set of sentences within the text and, based on the ranking of the set of sentences, extract a portion of the set of sentences. Further, the electronic device may generate an abstract summary using a portion of the parsed text.

The electronic device may train (block 330), using the object model and generated summary, a classification and/or an entity recognition model. The electronic device may further determine (block 335), using the classification model, a set of topics for any portion of text within the object model. Additionally, the electronic device may determine (block 340), for each topic in the set of topics, a probability that the topic is applicable to the regulation. In embodiments, the electronic device may output at least a portion of the regulation object model, where the data in the portion has a probability that at least meets a specified threshold. It should be appreciated that the specified threshold may be a default value and/or configurable.

The electronic device may enrich (block 345) the object model for the regulation with the summary of the regulation, the set of topics, and the set of extracted attributes, for each selected portion of the object model. Accordingly, with the enrichment and storage of multiple object models corresponding to multiple regulations, the method may ensure a consistent format and structure for the regulation object models across multiple jurisdictions.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A computer-implemented method of creating object models for regulations, the method comprising:
   accessing, by a computer processor, an electronic document corresponding to a regulation;
   segmenting, by the computer processor, the electronic document into a set of structured texts and a set of metadata, wherein the set of metadata comprises a set of topics descriptive of the regulation;
   generating, by the computer processor, an object model for the regulation, the object model comprising the set of structured texts and the set of metadata;
   generating, by the computer processor, a summary of the regulation using a machine learning algorithm;
   classifying, by the computer processor using a classifier model, a set of sentences contained in the electronic document, wherein each of the set of sentences has a probability of being applicable to at least one of the set of topics that at least meets a specified threshold; and
   enriching, by the computer processor, the object model for the regulation with (i) the summary of the regulation and (ii) the set of sentences that was classified.

2. The computer-implemented method of claim 1, further comprising:
  analyzing, by the computer processor, a portion of the set of structured texts within the object model using an entity recognition analysis to determine a set of entity names meaningful to the regulation; and
  enriching, by the computer processor, the object model with the set of entity names.

3. The computer-implemented method of claim 1, further comprising:
  outputting at least a portion of the set of structured texts within the object model corresponding to a set of keywords or phrases; and
  enriching, by the computer processor, the object model with the set of keywords or phrases.

4. The computer-implemented method of claim 1, further comprising:
  performing, by the computer processor, a linguistic analysis on the object model to detect the set of sentences within the set of structured texts.

5. The computer-implemented method of claim 4, wherein performing the linguistic analysis on the object model comprises one of:
  detecting the set of sentences and generating a set of token n-grams for each sentence in the set of sentences; or
  detecting the set of sentences from a set of n-grams tokenized from the set of structured texts.

6. The computer-implemented method of claim 1, wherein segmenting the electronic document comprises:
  segmenting the electronic document into one or more of header, footer, title, body, sections, sub-sections, paragraphs, lists, sub-lists, citations, or references.

7. The computer-implemented method of claim 1, further comprising:
  examining, by the computer processor, the electronic document to determine that the set of topics is not present;
  generating, by the computer processor, the set of topics for the electronic document; and
  storing the set of topics with the set of metadata.

8. A system for creating object models for regulations, comprising:
  a memory storing instructions; and
  at least one processor interfaced with the memory and configured to execute the instructions to cause the at least one processor to:
    access an electronic document corresponding to a regulation,
    segment the electronic document into a set of structured texts and a set of metadata, wherein the set of metadata comprises a set of topics descriptive of the regulation,
    generate an object model for the regulation, the object model comprising the set of structured texts and the set of metadata,
    generate a summary of the regulation using a machine learning algorithm,
    classify, using a classifier model, a set of sentences contained in the electronic document, wherein each of the set of sentences has a probability of being applicable to at least one of the set of topics that at least meets a specified threshold, and
    enrich the object model for the regulation with (i) the summary of the regulation and (ii) the set of sentences that was classified.

9. The system of claim 8, wherein the at least one processor is further configured to:
  analyze a portion of the set of structured texts within the object model using an entity recognition analysis to determine a set of entity names meaningful to the regulation, and
  enrich the object model with the set of entity names.

10. The system of claim 8, wherein the at least one processor is further configured to:
  output at least a portion of the set of structured texts within the object model corresponding to a set of keywords or phrases, and
  enrich the object model with the set of keywords or phrases.

11. The system of claim 8, wherein the at least one processor is further configured to:
  perform a linguistic analysis on the object model to detect the set of sentences within the set of structured texts.

12. The system of claim 11, wherein to perform the linguistic analysis on the object model, the at least one processor is configured to:
  detect the set of sentences and generating a set of token n-grams for each sentence in the set of sentences, or
  detect the set of sentences from a set of n-grams tokenized from the set of structured texts.

13. The system of claim 8, wherein to segment the electronic document, the at least one processor is configured to:
  segment the electronic document into one or more of header, footer, title, body, sections, sub-sections, paragraphs, lists, sub-lists, citations, or references.

14. The system of claim 8, wherein the at least one processor is further configured to:
  examine the electronic document to determine that the set of topics is not present,
  generate the set of topics for the electronic document, and
  store the set of topics with the set of metadata.

15. A non-transitory computer-readable storage medium configured to store instructions executable by one or more processors, the instructions comprising:
  instructions for accessing an electronic document corresponding to a regulation;
  instructions for segmenting the electronic document into a set of structured texts and a set of metadata, wherein the set of metadata comprises a set of topics descriptive of the regulation;
  instructions for generating an object model for the regulation, the object model comprising the set of structured texts and the set of metadata;
  instructions for generating a summary of the regulation using a machine learning algorithm;
  instructions for classifying, using a classifier model, a set of sentences contained in the electronic document, wherein each of the set of sentences has a probability of being applicable to at least one of the set of topics that at least meets a specified threshold; and
  instructions for enriching the object model for the regulation with (i) the summary of the regulation and (ii) the set of sentences that was classified.

16. The non-transitory computer-readable storage medium of claim 15, wherein the instructions further comprise:
  instructions for analyzing a portion of the set of structured texts within the object model using an entity recognition analysis to determine a set of entity names meaningful to the regulation; and
  instructions for enriching the object model with the set of entity names.

17. The non-transitory computer-readable storage medium of claim 15, wherein the instructions further comprise:
   instructions for outputting at least a portion of the set of structured texts within the object model corresponding to a set of keywords or phrases; and
   instructions for enriching the object model with the set of keywords or phrases.

18. The non-transitory computer-readable storage medium of claim 15, wherein the instructions further comprise:
   instructions for performing a linguistic analysis on the object model to detect the set of sentences within the set of structured texts.

19. The non-transitory computer-readable storage medium of claim 18, wherein the instructions for performing the linguistic analysis on the object model comprise one of:
   instructions for detecting the set of sentences and generating a set of token n-grams for each sentence in the set of sentences; or
   instructions for detecting the set of sentences from a set of n-grams tokenized from the set of structured texts.

20. The non-transitory computer-readable storage medium of claim 15, wherein the instructions further comprise:
   instructions for examining the electronic document to determine that the set of topics is not present;
   instructions for generating the set of topics for the electronic document; and
   instructions for storing the set of topics with the set of metadata.

* * * * *